(12) United States Patent
McElmurray et al.

(10) Patent No.: US 10,510,174 B2
(45) Date of Patent: Dec. 17, 2019

(54) CREATING A MIXED-REALITY VIDEO BASED UPON TRACKED SKELETAL FEATURES

(71) Applicant: Microsoft Technology Licensing, LLC, Redmond, WA (US)

(72) Inventors: John McElmurray, Seattle, WA (US); Gustaf Pettersson, Bellevue, WA (US); Karim Benchemsi, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 13 days.

(21) Appl. No.: 15/589,632

(22) Filed: May 8, 2017

(65) Prior Publication Data

US 2018/0322680 A1 Nov. 8, 2018

(51) Int. Cl.
| | |
|---|---|
| *G06T 13/00* | (2011.01) |
| *G06T 13/40* | (2011.01) |
| *G06K 9/00* | (2006.01) |
| *G06T 11/60* | (2006.01) |
| *G06K 9/03* | (2006.01) |
| *G06K 9/78* | (2006.01) |
| *G06T 19/00* | (2011.01) |
| *G06F 3/01* | (2006.01) |

(52) U.S. Cl.
CPC ............. *G06T 13/40* (2013.01); *G06F 3/011* (2013.01); *G06K 9/00255* (2013.01); *G06K 9/00281* (2013.01); *G06K 9/00315* (2013.01); *G06K 9/00342* (2013.01); *G06K 9/00369* (2013.01); *G06K 9/00711* (2013.01); *G06K 9/03* (2013.01); *G06K 9/78* (2013.01); *G06T 11/60* (2013.01); *G06T 19/006* (2013.01); *G06T 2200/24* (2013.01)

(58) Field of Classification Search
CPC .................................................... G06T 19/006
See application file for complete search history.

(56) References Cited

U.S. PATENT DOCUMENTS

| | | | |
|---|---|---|---|
| 9,552,668 B2 | 1/2017 | Yang et al. | |
| 2011/0091070 A1 | 4/2011 | Havaldar et al. | |
| 2012/0105473 A1* | 5/2012 | Bar-Zeev | G02B 27/017 345/633 |
| 2012/0194645 A1 | 8/2012 | Fuller et al. | |
| 2012/0249416 A1* | 10/2012 | MacIocci | G06F 3/011 345/156 |

(Continued)

OTHER PUBLICATIONS

Barakonyi, Istvan, "AR Puppet—Animated Agents in Mixed Reality Enviroments—PhD topic", In Publication of Institute for Computer Graphics and Vision, Feb. 10, 2017, 10 pages.

(Continued)

*Primary Examiner* — Charles Tseng
(74) *Attorney, Agent, or Firm* — Medley, Behrens & Lewis, LLC

(57) ABSTRACT

Technologies related to generating mixed reality video are described herein. Video frames capture a human, and positions of skeletal features of the human are estimated based solely upon the video frames. A mixed reality video is generated, wherein the mixed reality video includes the video combined with an animation, wherein the animation is based upon movement of the human in the video as represented by the estimated positions of the skeletal features of the human.

20 Claims, 12 Drawing Sheets

(56) References Cited

U.S. PATENT DOCUMENTS

| | | | |
|---|---|---|---|
| 2013/0083063 A1* | 4/2013 | Geisner | G06F 3/011 |
| | | | 345/633 |
| 2013/0127873 A1 | 5/2013 | Popovic et al. | |
| 2013/0335405 A1 | 12/2013 | Scavezze et al. | |
| 2014/0035901 A1 | 2/2014 | Chen et al. | |
| 2014/0225924 A1* | 8/2014 | Loxam | G06T 19/006 |
| | | | 345/633 |
| 2014/0274392 A1 | 9/2014 | Beran | |
| 2015/0146928 A1 | 5/2015 | Kim et al. | |
| 2015/0302662 A1* | 10/2015 | Miller | G06F 3/011 |
| | | | 345/633 |
| 2016/0267699 A1 | 9/2016 | Borke et al. | |

OTHER PUBLICATIONS

Li, et al., "SPA: Sparse Photorealistic Animation Using a Single RGB-D Camera", In Journal of IEEE Transaction on Circuits and Systems for Video Technology, Apr. 20, 2016, pp. 1-12.

* cited by examiner

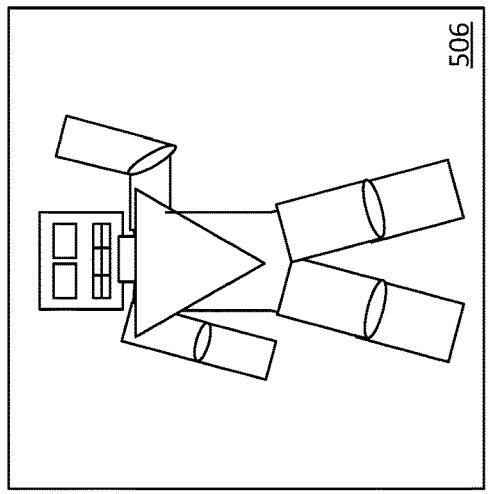
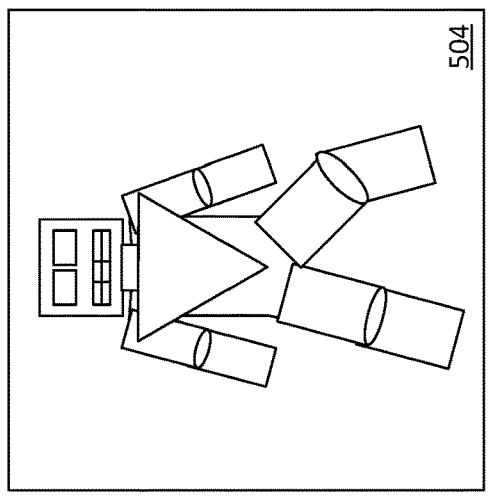
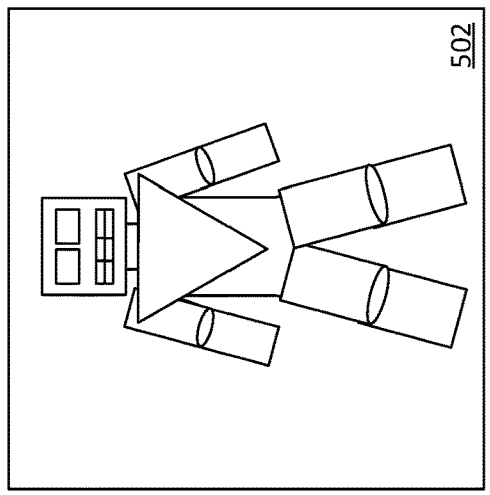
FIG. 5

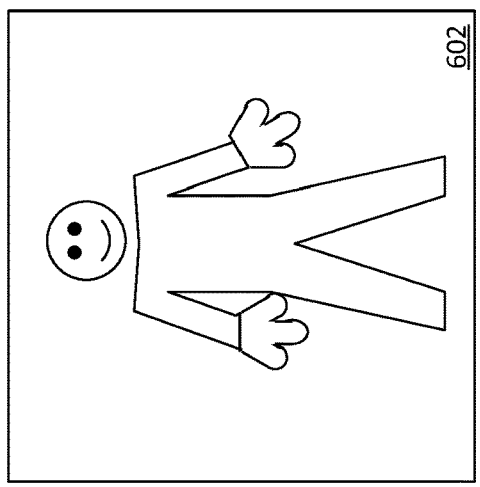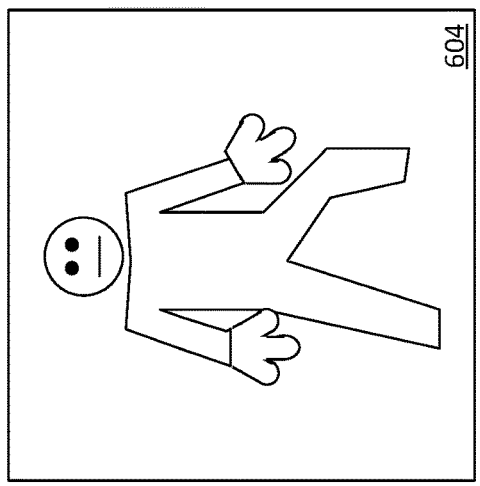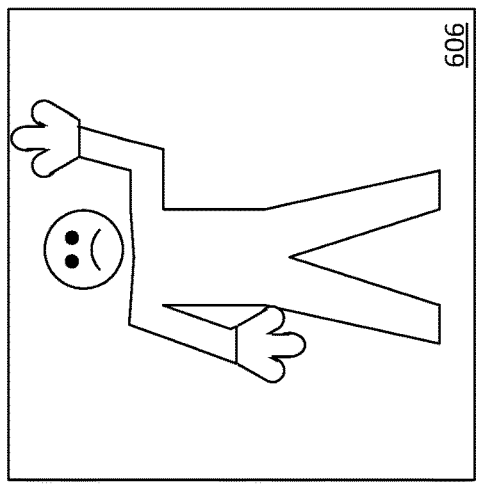
FIG. 6

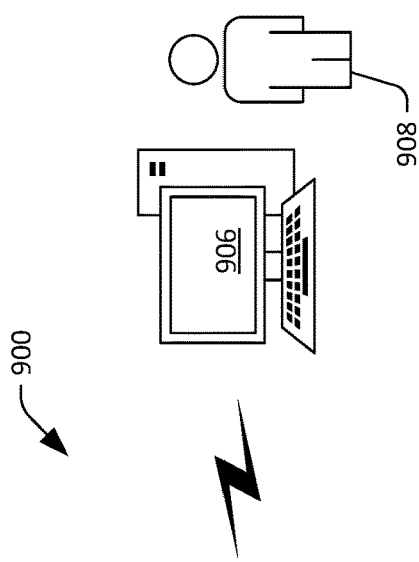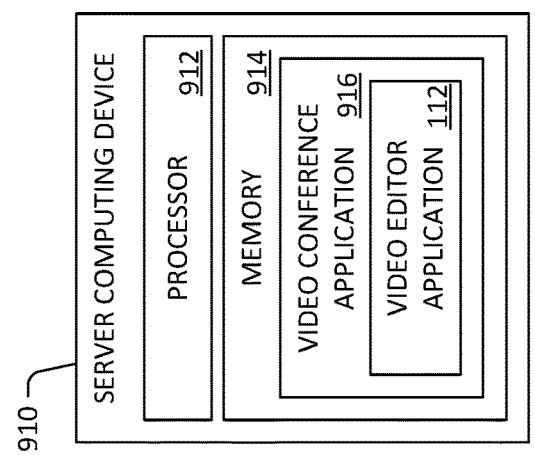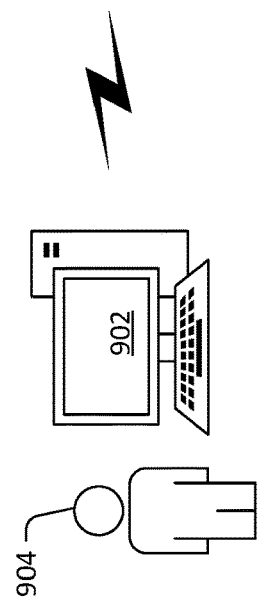
FIG. 9

US 10,510,174 B2

CREATING A MIXED-REALITY VIDEO BASED UPON TRACKED SKELETAL FEATURES

BACKGROUND

Creating a mixed-reality video (e.g., a video that includes imagery captured by a video camera as well as virtual imagery added "on top" of the imagery captured by the video camera) can be a labor-intensive task. For example, editing video generated by a red green blue (RGB) camera to include an animation requires that a user access individual frames of the video to include graphics at desired positions. Thus, if a user were to capture a video of himself walking and then wished to edit the video to depict an animated glove over the hands of the user while walking, the user must edit individual frames of the video to include the glove in the appropriate position.

Conventional approaches for creating mixed reality video that includes a moving human, designed to render the above-described process more efficient, require specialized sensors or markers that are applied to the human body, thereby allowing for motion capture. An exemplary specialized hardware sensor includes an RGB camera and a depth sensor synchronized with one another, wherein the sensor outputs data that can be analyzed to detect skeletal features of humans in the field of view of the sensor. These sensors, however, tend to be somewhat inflexible (as the sensors must be maintained in a fixed position) and expensive. Exemplary markers include infrared (IR) light emitters that are placed upon skin-tight suits that are to be worn by humans that are going to be captured in a video stream. This approach is often used for motion capture for purposes of big budget films and/or video games, but is not well-suited for widespread adoption, as it requires use of IR cameras and further requires humans to wear "unnatural" clothing.

SUMMARY

The following is a brief summary of subject matter that is described in greater detail herein. This summary is not intended to be limiting as to the scope of the claims.

Described herein are various technologies pertaining to creating an animation based upon estimated positions of skeletal features of a human captured in red-green-blue (RGB) video. With more specificity, described herein are various technologies for creating mixed-reality video based upon estimated positions of skeletal features of the human captured in the RGB video. A video camera (a red green blue video camera) is employed to capture video that includes a human body as the human body is moving. The video includes several frames, where each frame in the several frames includes the human body. A computing device that executes a video editor application receives the video and, for each frame in the several frames, the video editing application estimates positions of skeletal features of the human body based solely upon the video (e.g., depth data is not used to estimate the positions of the skeletal features). For example, the video editor application can estimate positions of the following skeletal features of the human body: feet, knees, hips, root joint, spine, shoulders, elbows, wrists, neck, and head.

A user of the video editor application may then indicate that a video that includes animation is to be created, where the animation is based upon the estimated positions of the skeletal features of the human body. For instance, the user of the video editor application can indicate that a mixed reality video is to be generated, where animation is to be added "on top of" the video captured by the RGB video. In a non-limiting example, the user of the video editor application can indicate that the human body in the video is to be replaced with a character selected by the user of the video editor application, where movement of the character in the mixed-reality video maps to movement of the human body. Therefore, for instance, the user of the video editor application can indicate that a mixed reality video is to be generated using the received video, and the user can further indicate that the mixed reality video is to include the human body wearing a tuxedo. The video editor application, for each set of estimated positions of skeletal features (e.g., for each frame), maps at least some of the estimated two-dimensional positions of the skeletal features of the human to a three-dimensional model of the tuxedo, thereby driving the tuxedo based upon movement of the human in the video. For each frame of the video, the three-dimensional model of the tuxedo can then be mapped to two-dimensional space, and positioned in the frame in accordance with the estimated positions of the skeletal features of the human in the frame. Therefore, a mixed reality video is created, where the human body in the video is depicted as including a tuxedo (which moves in the video as the human body moves). It can be ascertained that this approach requires no specialized hardware; rather, the video can be captured by a commodity device, such as a web cam or mobile telephone.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 5 depicts exemplary frames of a mixed reality video, wherein the mixed reality video includes animation that is based upon estimated positions of skeletal features of a human body captured in frames of RGB video.

FIG. 6 depicts exemplary frames of a mixed reality video, wherein the mixed reality video includes animation that is based upon estimated positions of skeletal features of a human body captured in frames of RGB video.

FIG. 9 is a functional block diagram of another exemplary system that is configured to generate a mixed reality video in real-time.

DETAILED DESCRIPTION

Figure 1:
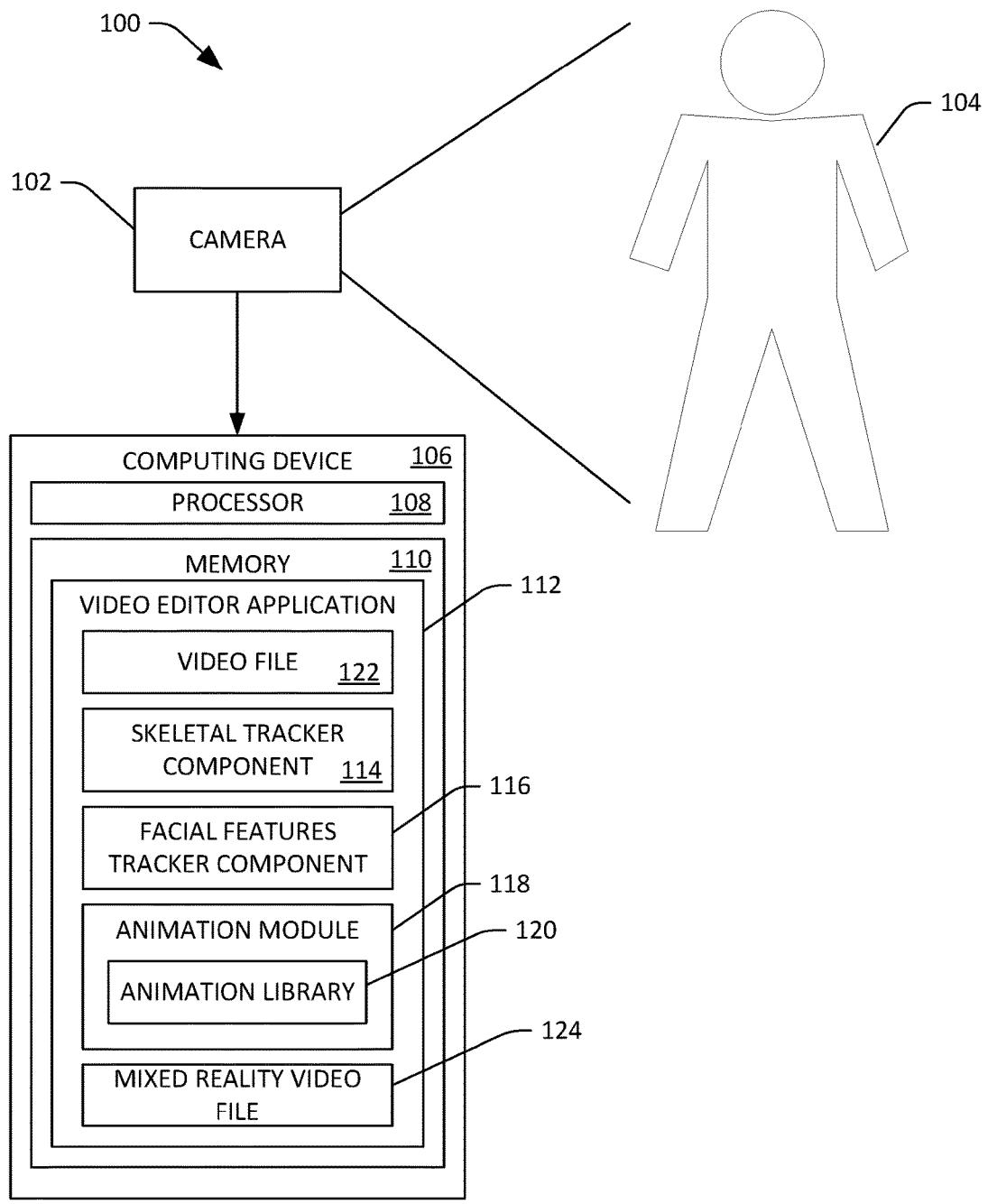
FIG. 1 is a functional block diagram of an exemplary system that is configured to generate a mixed reality video.

Various technologies pertaining to creating animation based upon estimated positions of skeletal features of a human body captured in frames of a red-green-blue (RGB) video are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Various technologies are described herein that pertain to generating mixed reality video based upon video captured by a RGB camera, wherein the mixed reality video includes animation that is based upon estimated positions of skeletal features of a human body captured in frames of the RGB video. Further, the positions of the skeletal features of the human body are estimated based solely upon the frames of the RGB video. Accordingly, a user can capture video that includes a human body using a commodity RGB camera, such as one found in a mobile telephone, a web camera, or the like. Positions of skeletal features of the human body can be estimated in the frames, and animation can be driven based upon the estimated positions of the skeletal features. In an example, the animation can be placed "on top of" the video captured by the RGB camera, thereby generating the mixed reality video, wherein the animation is based upon movement of the human body (as determined from the estimated positions of the skeletal features). Thus, in an example, a character can be placed over the human body in the RGB video captured by the RGB camera, and movement of the character is based upon movement of the human body in the RGB video.

With reference now to FIG. 1, an exemplary system 100 that facilitates generating mixed reality video is illustrated. The system 100 includes an RGB camera 102 that captures images of a human 104 at a video frame rate. Accordingly, the camera 102 is used to generate video, wherein the video includes a plurality of frames. The camera 102 can be a commodity RGB camera, such as one found in a mobile computing device (e.g. a mobile telephone or tablet computing device), a web camera, a body camera, or the like.

The system 100 additionally includes a computing device 106. While the camera 102 is depicted as being separate from the computing device 106, it is to be understood that the camera 102 may be integral to the computing device 106. The computing device 106 can be any suitable computing device, such as a client computing device (e.g., a mobile telephone, a tablet computing device, a desktop computing device, etc.) or a server computing device (e.g., included in a data center). The computing device 106 includes a processor 108 and memory 110, wherein the memory 110 includes a video editor application 112 that is executed by the processor 108.

The video editor application 112 includes a skeletal tracker component 114 that is configured to estimate positions of skeletal features of one or more humans in frames of video, wherein the skeletal tracker component 114 estimates positions of the skeletal features in the frames of the video based solely upon the frames of the video. Exemplary skeletal features whose positions can be estimated by the skeletal tracker component 114 include, but are not limited to including, feet (2), knees (2), hips (2), root joint (1), spine (1), shoulders (2), elbows (2), wrists (2), neck (1), and head (1). In an exemplary embodiment, the skeletal tracker component 114 can be configured to estimate positions of skeletal features of the human in each frame of video loaded into the video editor application 112. For example, the skeletal tracker component 114, for each skeletal feature of a human body identified in each frame, can estimate X,Y coordinates (or a line defined by two X,Y coordinates) for the skeletal feature, wherein the X,Y coordinates map to a pixel of the frame. Thus, when a frame includes an entirety of a human body, the skeletal tracker component 114 can output 16 X,Y coordinates—one for each of the skeletal features referenced above.

The video editor application 112 also includes a facial features tracker component 116 that is configured to track facial features of one or more humans captured in frames of video. Exemplary facial features that can be tracked by the facial features tracker component 116 include centers of eyes, nasal alars, a mouth line, points in an eyebrow, etc.

The video editor application 112 further includes an animation module 118 that is configured to construct an animation and is further configured to generate a mixed reality video that includes the animation. The animation module 118 is configured to construct the animation and generate the mixed reality video based upon estimated positions of skeletal features of a human as determined by the skeletal tracker component 114. The animation module 118 can include an animation library 120 that comprises a plurality of user-selectable graphics that can be animated. These graphics can include representations of characters, clothing, accessories, etc. The animation module 118 constructs the animation such that a selected graphic or graphics is animated (e.g., a selected character is animated such that its movements mimic movements of a human captured in video generated by the camera 102).

Exemplary operation of the system 100 is now set forth. The camera 102 is operated to capture images of the human 104 at a video frame rate. It is to be understood that the camera 102 need not be fixed to a particular position. Accordingly, the camera 102 may be in a mobile phone that is held in a hand of a user who is capturing the video (who may be the human 104 or another user). In the example shown in FIG. 1, the camera 102 can output a video file 122, wherein the video file 122 includes several frames that capture at least a portion of the body of the human 104. The video editor application 112 can receive an indication from a user of the computing device 106 (who may be the user operating the camera 102, the human 104, or another user) that the video editor application 112 is to generate a mixed reality video based upon the video file 122, wherein the mixed reality video includes animation, and further wherein the animation is based upon estimated positions of skeletal features of the human 104 in the frames of the video file 122.

Responsive to receiving the indication that the mixed reality video is to be generated, the video editor application 112 can load the video file 122 therein. The skeletal tracker component 114 can estimate positions of skeletal features of the human 104 in frames of the video file 122 that include the human 104. The skeletal tracker component 114 can utilize a multi-stage approach when estimating the positions of the skeletal features of the human 104 in the frames of the video file 122. In a first stage, the skeletal tracker component 114 generates, for each video frame in the video file 122 that includes at least a portion of the body of the human 104, initial estimates of positions of the skeletal features of the human 104. For example, the skeletal tracker component 114, as will be described in greater detail below, can include a machine-learned algorithm that is trained based upon labeled frames of video that include humans, wherein the labels identify skeletal positions of the humans and positions of the skeletal features in the frames of the video. The skeletal tracker component 114 can be configured to probabilistically generate the initial estimates. Thus, for instance, a pixel in a frame of video can be assigned multiple scores, one for each skeletal feature whose position is to be estimated by the skeletal tracker component 114. With respect to a skeletal feature, the skeletal tracker component 114 can identify the pixel in the frame with the highest score for the skeletal feature, and can output the X,Y coordinates of the pixel in the frame as an initial estimate of the position of the skeletal feature. It can be ascertained that a frame of video file 122 may not include all detectable skeletal features (e.g., the frame may not capture the feet of the human body 104). To account for such possibility, the skeletal tracker component 114 can refrain from outputting an initial estimate for a position of a skeletal feature if no pixel in the frame has a score above a predefined threshold. Again, the output of the first stage is, for each frame that includes at least a portion of the body of the human 104, initial estimates of positions of at least some of the skeletal features of the human 104.

The second stage of the multi-stage approach is a cleanup stage, where the skeletal tracker component 114 can identify impossible and/or improbable configurations (based upon plausible human positioning and joint angles), and can discard or modify initial estimates of skeletal features responsive to identifying such configurations. In an example, in the first stage and for a frame in the video file 122, the skeletal tracker component 114 can output initial estimates of positions of a right hip and a right shoulder of the human 104, where (in the initial estimates) the right hip is above the right shoulder. In another example, in the first stage and for a frame in the video file 122, the skeletal tracker component 114 can output initial estimates of positions of a left arm and both feet of the human 104, where (in the initial estimates) the left arm is below both of the feet of the human 104. Again, this is an improbable or impossible skeletal configuration, and can be identified by the skeletal tracker component 114. For a frame in the video file 122 where the initial estimates of positions of skeletal features represent an impossible and/or improbable skeletal configuration, the skeletal tracker component 114, in an exemplary embodiment, can discard all of the initial estimates. The skeletal tracker component 114 can replace these initial estimates by interpolating between frames that surround the frame in the video file 122. In another example, the skeletal tracker component 114 can identify one or more initial estimates for a frame in the video file 122 that is most likely to be incorrect (e.g., based upon joint angle), and can replace the one or more initial estimates based by identifying a pixel in the frame that has a second highest score for a skeletal feature that corresponds to the (likely) incorrect skeletal feature. For instance, for a frame in the video file 122, and during the cleanup stage, the skeletal tracker component 114 can identify an impossible skeletal configuration due to a right knee being below a right foot (based upon the initial estimates). The skeletal tracker component 114 can determine that the initial estimate for the right knee is most likely to be incorrect based upon joint angles represented by the initial estimates. The skeletal tracker component 114 can identify a pixel in the frame that has the second highest score for the right knee, and can update the initial estimates by replacing the initial estimate of the position of the right knee with X,Y coordinates of the pixel with the second highest score.

The third state of the multi-stage approach can be configured to reduce jitter (or other noise) in the estimated positions of the skeletal features of the human 104. Thus, in the third stage, the skeletal tracker component 114 can perform a frame-by-frame comparison to ensure that skeletal movements of the human 104, across adjacent frames or across some relatively small threshold number of frames, is smooth. In an example, when comparing estimated positions of a right hand of the human 104 with respect to two adjacent frames of the video file 122, the skeletal tracker component 114 can determine that the position of the hand changes too much (e.g., for one frame, the right hand is estimated to be above the head of the human 104, and in an adjacent frame, the right hand is estimated to be below the knee of the human 104). In the third stage, then, the skeletal tracker component 114 can smooth frame-by-frame data for each tracked skeletal feature mathematically, thereby reducing jitter. The output of the skeletal tracker component 114 is thus a sequence of estimated positions of skeletal features of the human 104 as captured in frames of the video file 122, where sequence of estimated positions represents movement of the human 104 across the frames of the video file 122.

The facial features tracker component 116, prior to, subsequent to, or in parallel with the skeletal tracker component 114 estimating skeletal positions of the human 104 in the frames of the video file 122, can estimate positions of facial features of the human 104 in the frames of the video file 122 that include the human 104. In some cases, and for some animations, inclusion of the facial features tracker component 116 in the video editor application 112 is optional.

Prior to, subsequent to, or during the skeletal tracker component 114 estimating the positions of the skeletal features of the human 104 in the frames of the video file 122, the user of the computing device 106 can select one or more graphics that are to be animated based upon the estimated positions of the skeletal features of the human 104 in the frames of the video file 122. For instance, a graphical user interface of the video editor application 112 can depict several selectable graphics that may be animated, and the user of the computing device 106 can select a desired graphic.

The animation module 118, using the estimated positions of the skeletal features of the human 104 in the frames of the video file 122 and/or the estimated positions of the facial features of the human 104 in the frames of the video file 122, can generate a mixed reality video file 124 that includes the selected animation. The mixed reality video file 124, in an example, is the video file 122 edited to include animation. The animation module 118, when creating the mixed reality video file 124, uses the estimated positions of the skeletal features of the human 104 to drive animation of a three-dimensional model (e.g., a bipedal, humanoid, or other character) by manipulating joints of the three-dimensional model based upon the estimated positions of the skeletal features across the frames of the video file 122. The animation module 118 can include an inverse kinematics (IK) solver (not shown), and can also filter implausible skeletal positions from two-dimensional skeletal features output by the skeletal tracker component 114 using trigonometric operations in the IK solver.

When the selected graphic(s) is a character that, when animated by the animation module 118, is to cover a face of the human 104 in the mixed reality video file 124, estimated positions of the facial features of the human 104 in the frames of the video file 122 (output by the facial features tracker component 116) are used to turn the head of the animated character and to further transfer the facial expression of the human 104 onto the animated 3-D character in the mixed reality video file 124. The animation module 118 can then combine the RGB footage in the video file 122 with the rendering of the animated character, resulting in the mixed reality video file 124, where actions of the human 104 are represented in the animated character.

The animation module 118 can further support a cleanup stage, where the user of the computing device 106 can manually alter position of the animated character in the mixed reality video file 124. For instance, the user of the computing device 106 can use a pen (stylus) or other input device to you erase parts of the human 104 that may appear beneath the animated character in the mixed reality video file 124, wherein conventional content-aware image repairing techniques can be employed. The user of the computing device 106 may then replay the mixed reality video file 124 for his or her own enjoyment, or share the mixed reality video file 124 with contacts of the user of the computing device 106.

The system 100 exhibits various advantages over conventional approaches for editing RGB files. As described above, a mixed reality video can be generated based upon skeletal positions of the human 104 without requiring hardware in addition to a commodity RGB camera. Accordingly, the user of the computing device 106 need not go frame by frame to manually incorporate an animated character, which is a labor-intensive process. Further, the user of the computing device 106 can create a mixed reality video using only two actions: 1) identifying the video that is to be used to generate the mixed reality video; and 2) selecting an animation that is to be included in the mixed reality video.

Figure 2:
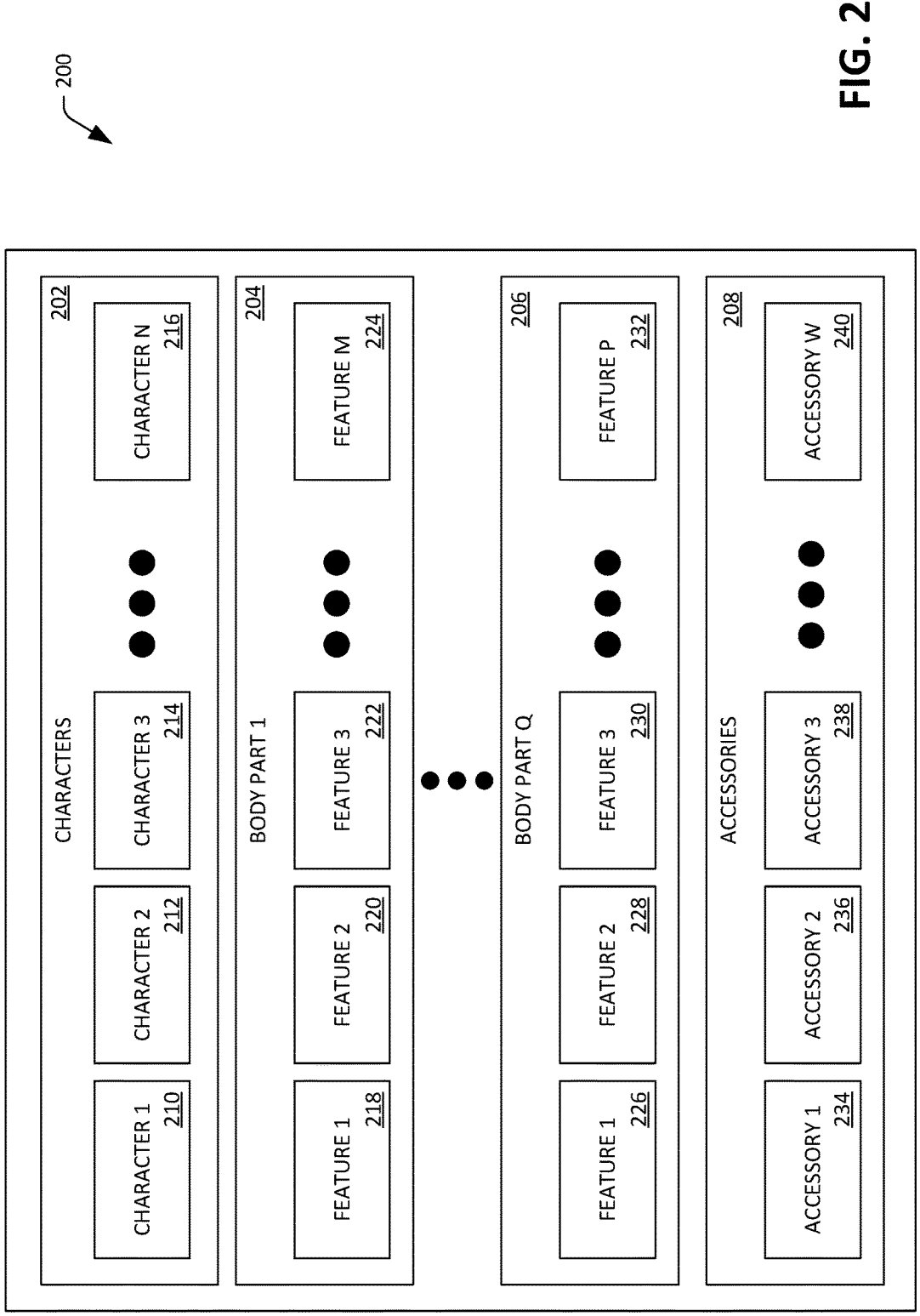
FIG. 2 illustrates an exemplary graphical user interface that can depict selectable animations, wherein a mixed reality video can be generated that includes an animation from the selectable animations.

Referring now to FIG. 2, an exemplary graphical user interface 200 for the video editor application 112 is depicted. The graphical user interface 200 includes several rows 202-208 of different types of graphics that can be animated in a mixed reality video (e.g., selectable animations). For instance, the first row 202 can include a plurality of characters 210-216 that can be included in the mixed reality video file 124. These characters may include monsters, aliens, robots, or portions thereof. The second row 204 may include selectable animations 218-224 for a particular body part. For example, the body part may be a leg, and selectable animations may include shin guards that are to be placed over a leg, pants that are to be placed over legs, etc. The third row 206 can include animations 226-232 for a Qth body part. For instance, the Qth body part may be a hand, and the animations may include entities that may cover a hand, such as boxing gloves, a baseball glove, or the like. The fourth row 208 may include accessories 234-240 that may be included in the mixed reality video file 124. For example, rather than mapping positions of the 2-D skeleton to a 3-D model, such that the character mimics movement of the human 104 in the frames of the video file 122, an animation can be presented together with the human 104 in the mixed reality video file 124 based upon the estimated positions of skeletal features of the human 104 in the frames of the video file 122. For example, an accessory may be a football that floats towards or away from a hand of the human 104 in the mixed reality video file 124. In another example, an accessory in the fourth row 208 may be an animal (e.g. a cartoon dog) that, in the mixed reality video file 124, walks over and lays at the feet of the human 104 in the mixed reality video file 124. The user or the computing device 106 can select multiple animations to be included in the mixed reality video file 124. In a nonlimiting example, the user of the computing device 106 can select an animation that is representative of a football player from the first row 202 and may select a ball from the fourth row 208, such that in the mixed reality video file 124, a football character is shown with a football in his hand.

Figure 3:
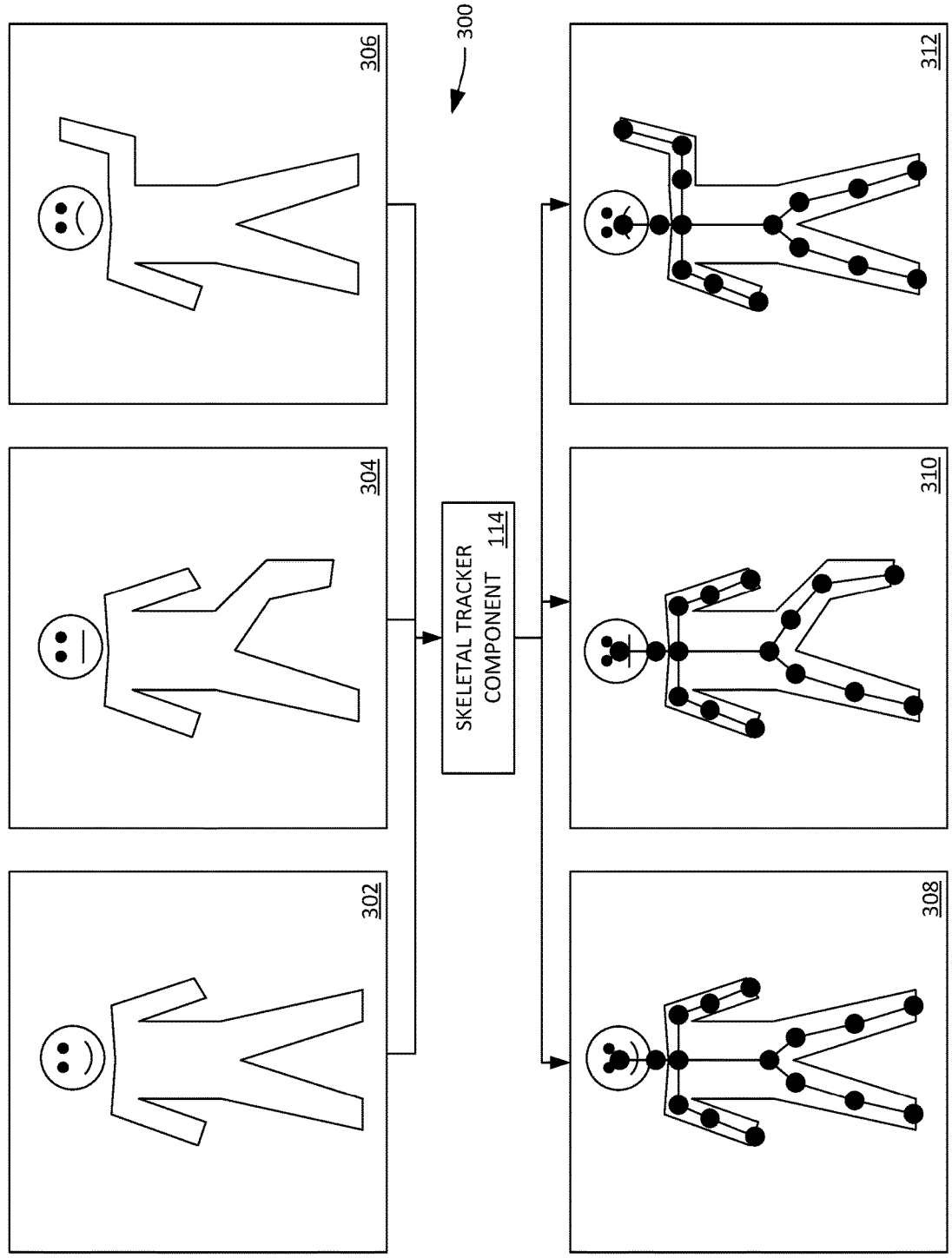
FIG. 3 depicts an exemplary operation of a skeletal tracker component that is configured to estimate positions of skeletal features of a human body in frames of a red-green-blue (RGB) video based solely upon the frames of the RGB video.

Now referring to FIG. 3, a graphical depiction 300 of operation of the skeletal tracker component 114 is illustrated. In the exemplary depiction 300 shown in FIG. 3, the skeletal tracker component 114 receives three frames 302-306 of the video file 122 (where the frames 302-306 may not be adjacent frames in the video file 122). In each of the frames 302-306, the skeletal tracker component 114 estimates positions of skeletal features of the human 104 in the frames 302-306. These estimated positions are depicted in annotated frames 308-312, which correspond to frames 302-306. It is to be understood that the skeletal tracker component 114 need not annotate the frames 302-306 with the estimated positions of skeletal features of the human 104, instead, the skeletal tracker component 114 can output X,Y coordinates for the skeletal features for each of the frames 302-306, where such estimated positions are used to drive an animation.

Figure 4:
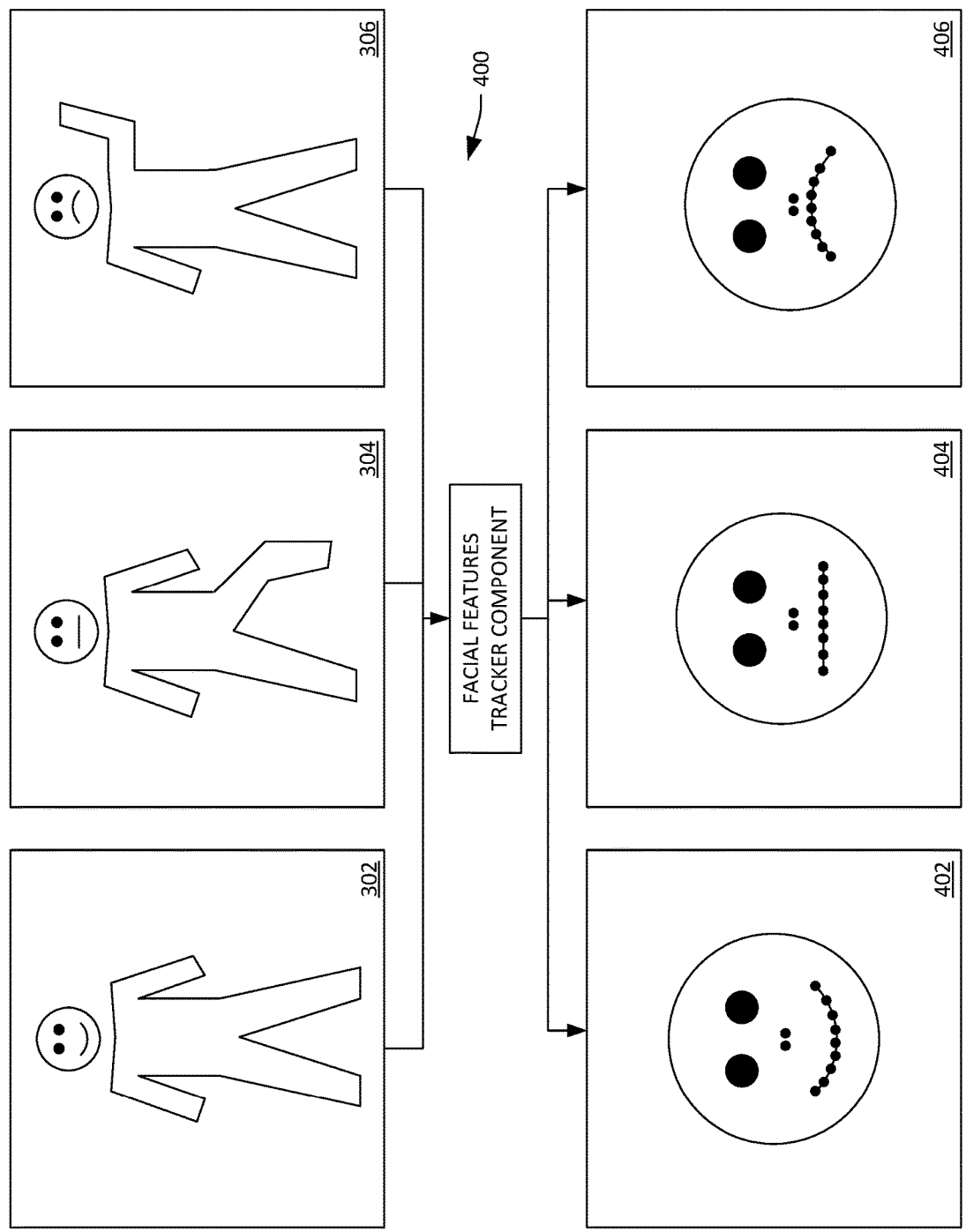
FIG. 4 illustrates exemplary operation of a facial features tracker component that is configured to track facial features of a human captured in frames of RGB video based solely upon the frames of the RGB video.

Now referring to FIG. 4, a graphical depiction 400 of operation of the facial features tracker component 116 is illustrated. The facial features tracker component 116 receives the frames 302-306 and tracks facial features therein as shown in views 402-406. As described above, these tracked facial features can drive expressions of characters shown in the mixed reality video file 124.

Referring now to FIG. 5, frames 502-506 of the mixed reality video file 124 are illustrated, wherein the user of the computing device 106 has selected a robot character to be depicted in the mixed reality video file 124, and further where movement of the robot character across the frames 502-506 is based upon the estimated positions of the skeletal features identified by the skeletal tracker component 114 (as illustrated in FIG. 3). As described above, the two-dimensional estimated skeletal positions can be mapped to joints of the three-dimensional robot model, where movement of the robot character represents movement of the human 104 in the frames 302-306 of the video file 122.

FIG. 6 depicts another exemplary animation, where rather than an entire character being shown in a mixed reality video, frames 602-606 of the mixed reality video file 124 depict animated features that are mapped to specific body parts of the human 104. Here, for example, gloves are rendered to map to the motion of the human 104 in the video file 122. Hence, the frames 602-606 of the mixed reality video file 124 depict gloves covering the hands of the human 104.

Figure 7:
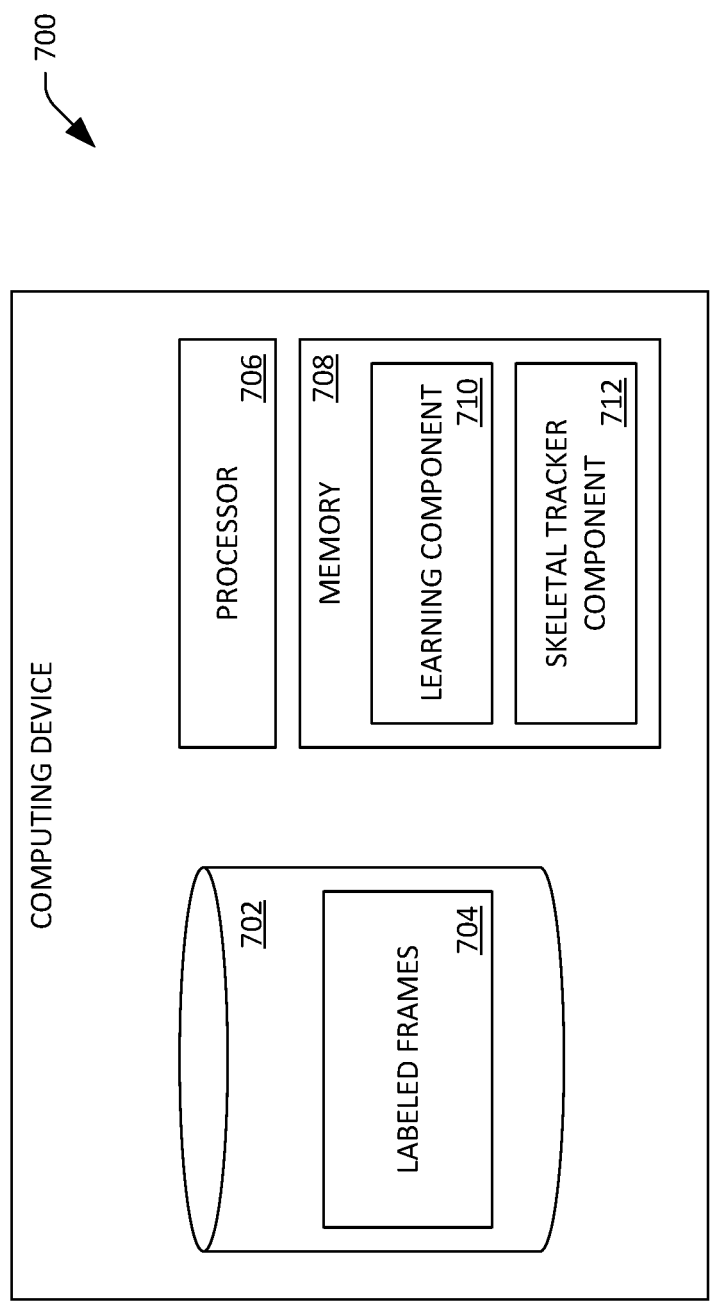
FIG. 7 illustrates a functional block diagram of an exemplary system that is configured to learn a skeletal tracker component, wherein the skeletal tracker component is configured to estimate positions of skeletal features of a human body in frames of RBG video based solely upon the frames of the RBG video.

Now referring to FIG. 7, an exemplary computing device 700 that is configured to learn the skeletal tracker component 114 is illustrated. The computing device 700 can be any suitable type of computing device, including a desktop computing device, a server computing device, or the like. The computing device 700 includes a data store 702, which includes labeled frames 704 of numerous video files. The labeled frames 704 are training data that is used to learn the skeletal tracker component 114. With more particularly, the labeled frames 704 each include one or more humans therein, and are (manually) labeled to identify positions of skeletal features of the humans.

The computing device 700 additionally includes a processor 706 and memory 708, wherein the memory 708 has a learning component 710 loaded therein. The learning component 710 can be or include a machine-learning algorithm that is configured to learn the skeletal tracker component 114 based upon the labeled frames 704. With more particularly, each frame in the labeled frames 704 has several features associated therewith, wherein such features include the labeled positions of skeletal features of humans in the frames. Exemplary features can also include contrast at certain locations, color hues existent in the frames, amongst numerous other features. The learning component 710 can learn weights that are to be assigned to such features by the skeletal tracker component 114, such that when the skeletal tracker component 114 receives a (unlabeled) frame of video that includes the human 104, the skeletal tracker component 114 can output estimates of positions of skeletal features of the human 104 in the frame.

Figure 8:
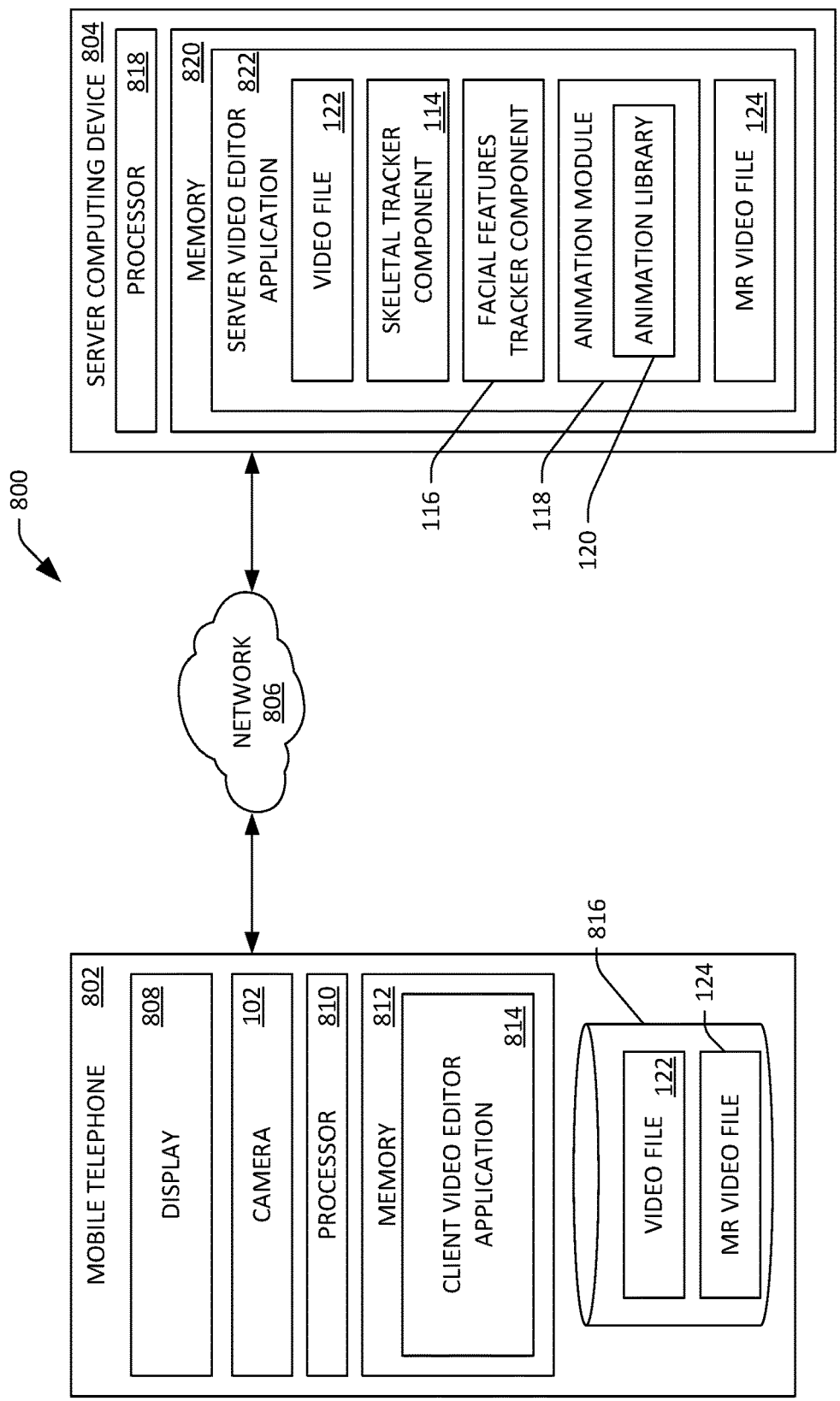
FIG. 8 is a functional block diagram illustrating an exemplary system that facilitates creating a mixed reality video.

With reference now to FIG. 8, an exemplary system 800 that facilitates creating the mixed reality video file 124 is illustrated. The system 800 includes a mobile telephone 802 that is in communication with a server computing device 804 by way of a network 806. The server computing device 804, for example, may be included in a data center. The mobile telephone 802 includes a display 808 that can be configured to display graphical data to a user of the mobile telephone 802. The mobile telephone 802 also includes the camera 102, a processor 810, and memory 812. The memory 812 includes a client video editor application 814 that is executed by the processor 810. The mobile telephone 802 can also include a data store 816. The camera 102 can be utilized to generate the video file 122, which can be retained in the data store 816.

The server computing device 804 includes a processor 818 and memory 820. The memory includes a server video editor application 822, wherein the server video editor application 822 comprises the skeletal tracker component 114, the facial features tracker component 116, and the animation module 118. In operation, the user of the mobile telephone 802 causes the camera 102 to generate the video file 122. Subsequently, the user of the mobile telephone 802 can cause the client video editor application 814 to be loaded into the memory 812, and can indicate that a mixed reality video file is to be generated based upon the video file 122. The client video editor application 814 establishes a connection with the server video editor application 822, thereby causing the mobile telephone 802 to upload the video file 122 to the server computing device 804.

The server computing device 804 receives the video file 122 and a selection of an animation from the mobile telephone 802. The server video editor application 822 can load the video file 122 therein, and the skeletal tracker component 114, the facial features tracker component 116, and the animation module 118 can operate as described above. The server video editor application 822 generates the mixed reality video file 124 and can optionally store the mixed reality video file 124 in persistent storage of the server computing device 804. Additionally or alternatively, the server video editor application 822 can transmit the mixed reality video file 124 to the mobile telephone 802 by way of the network 806, where the mobile telephone 802 can retain the mixed reality video file 124 in the data store 816. In yet another example, the mobile telephone 802 can stream the mixed reality video file 124 from the server computing device 804 upon request, and moreover, the user of the mobile telephone 802 can share the mixed reality video file 124 with others (e.g., by way of a link to the mixed reality video file 124, by way of a social network application, etc.).

Now referring to FIG. 9, an exemplary system 900 is depicted, where the video editor application 112 is included in a videoconference application. The system 900 includes a first computing device 902 operated by a first user 904 and a second computing device 906 operated by a second user 908. The system 900 also includes a server computing device 910 that is in network communication with the first computing device 902 and the second computing device 906. The server computing device 910 includes a processor 912 and memory 914, wherein the memory 914 has a videoconference application 916 loaded therein. In this example, the videoconference application 916 includes the video editor application 112. In the exemplary embodiment shown in FIG. 9, the video editor application 112 can be a real-time application that generates mixed reality video frames as frames of video are received from either or both of the computing device 902 and 906.

In an example, the first computing device 902 can include a web camera that is directed at the first user 904, wherein at least a portion of the body of the first user 904 is captured in video frames generated by the web camera. The first user 904 and the second user 908 may be participating in a videoconference by way of the server computing device

910, such that, for example, the frames generated by the web camera are transmitted to the server computing device 910 in real-time. The videoconference application 916 establishes a communications channel between the first computing device 902 and the second computing device 906, and accordingly receives the frames output by the web camera.

The video editor application 112 receives these frames and generates mixed reality frames as the frames are received. The server computing device 910 then transmits the mixed reality frames to the second computing device 906, where the mixed reality frames can be viewed by the second user 908. Simultaneously, a web camera coupled to the second computing device 906 can generate video frames that capture at least a portion of the body of the second user 908. The second computing device 906 transmits such frames to the server computing device 910, whereupon the video editor application 112 generates mixed reality frames based upon the frames received from the second computing device 906. The server computing device 910 then transmits these mixed reality frames to the first computing device 902, where they can be viewed by the first user 904. Either the first user 904 or the second user 908 can select the animations that are to appear in either of the mixed reality frames. For example, the first user 904 may wish that the second user 908 be provided with mixed reality video that is based upon motion of the first user 904, wherein movement of the first user is represented by an animated alien. In another example, the second user 908 can select an animation that is to be viewed by the second user 908. Thus, for instance, the second user 908 can indicate that she wishes to have a halo to be shown over a head of the first user 904 in the video stream presented at the second computing device 906.

Figure 10:
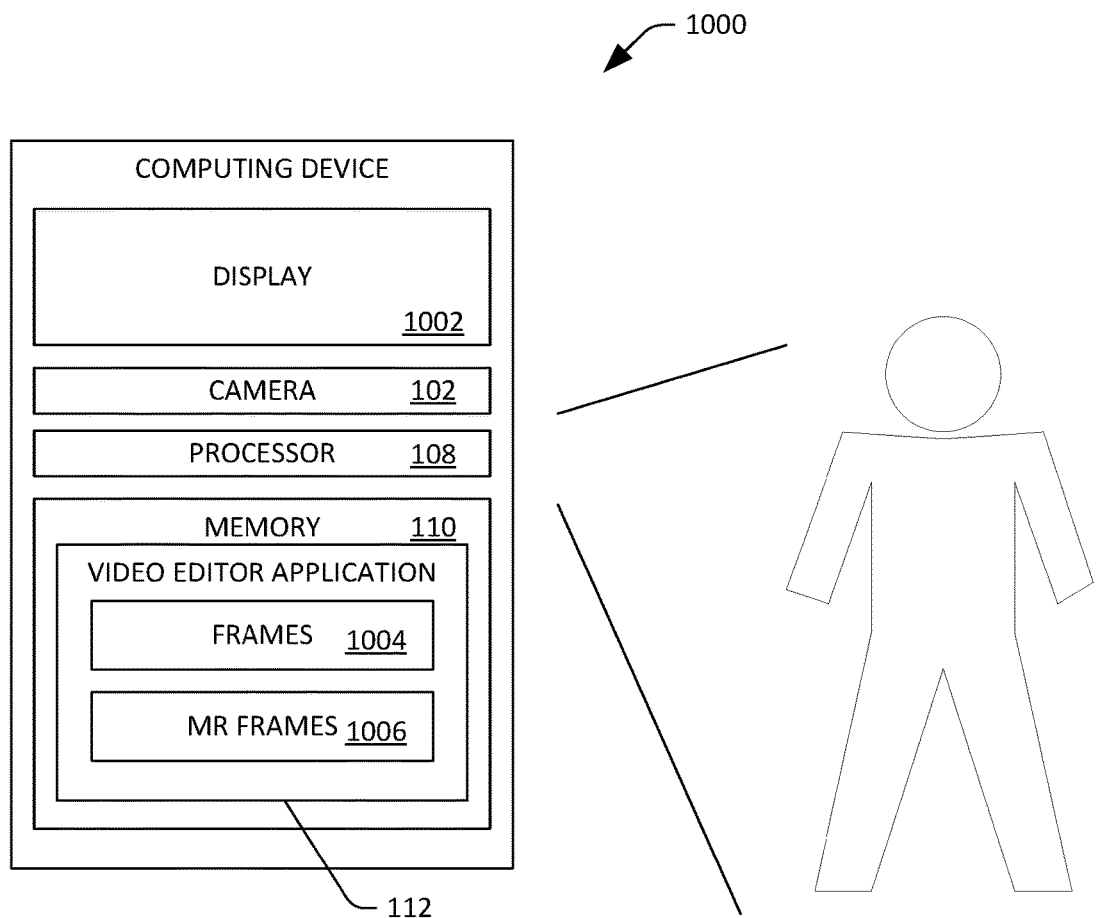
FIG. 10 depicts an exemplary mobile computing device that is configured to generate a mixed reality video based upon estimated positions of skeletal features of a human body captured in the video.

Referring now to FIG. 10, an exemplary computing device 1000 that can be configured to generate and display mixed reality video in real-time is illustrated. The computing device 1000 can be a mobile computing device, such as a tablet computing device or a mobile telephone. The computing device 1000 includes a display 1002, which can depict video. The computing device 1000 also includes the camera 102, the processor 108, and the memory 110, wherein the memory 110 has the video editor application 112 loaded therein. A user of the computing device 1000 aims the camera 102, such that the human 104 is in a field of view of the camera 102. The camera 102 generates frames 1004 at a video rate, wherein each frame is received by the video editor application 112. The video editor application 112 can generate mixed reality frames 1006 based upon the frames 1004 output by the camera 102, wherein the mixed reality frames 1006 include characters at positions in the mixed reality frames that are based upon the estimated positions of the skeletal features of the human 104 in the frames 1004. The video editor application 112 may then output the mixed reality frames 1006 to the display 1002. Hence, a user of the computing device 1000 can view the display 1002 and be provided with mixed reality frames in real-time as the camera 102 captures images of the human 104. Additionally, while not shown, the computing device 1000 can be configured to record these mixed reality frames and format them in a video file for subsequent viewing by the user of the computing device 1000 (and/or for subsequent editing).

Figure 11:
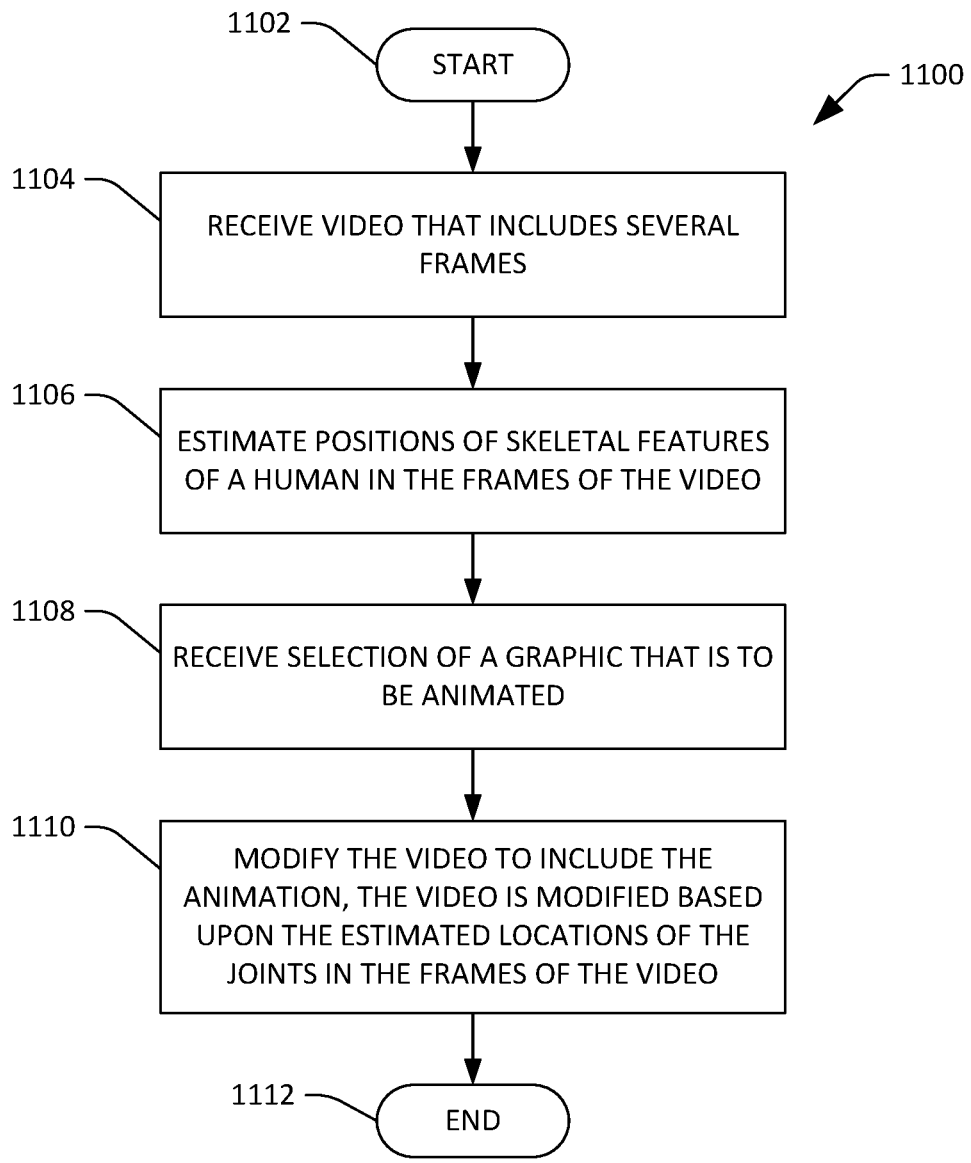
FIG. 11 is a flow diagram illustrating an exemplary methodology for generating a mixed reality video.

FIG. 11 illustrates an exemplary methodology relating to generating mixed reality video based upon estimated positions of skeletal features of a human body in frames of video. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology 1100 starts at 1102 and, at 1104, RGB video is received that includes several frames, wherein the frames capture a human in motion. At 1106, positions (locations) of skeletal features of the human are estimated in the frames of the video. As described above, estimating the positions of the skeletal features in the frames of the video can be a multi-stage process. At 1108, selection of a graphic (e.g., a three-dimensional model) that is to be animated is received. At 1110, a mixed reality video is generated, wherein the mixed reality video includes the animated graphic, wherein the animation is based upon the estimated positions of the skeletal features of the human in the video file. The methodology 1100 completes at 1112.

Figure 12:
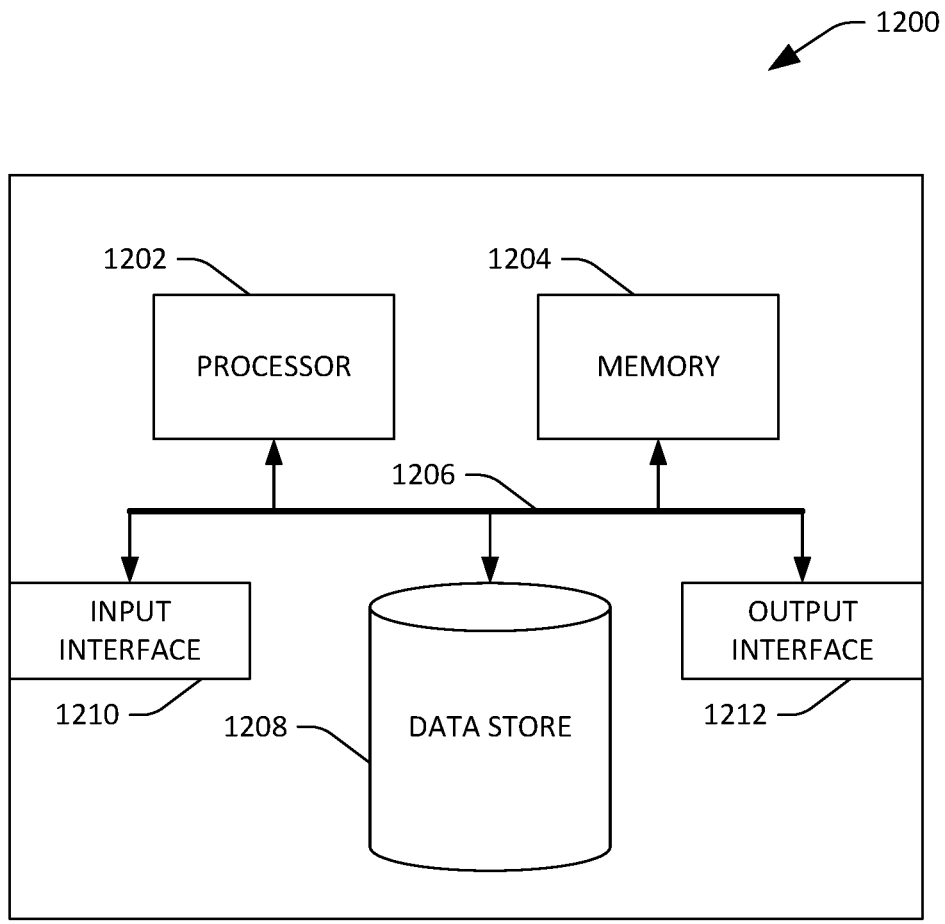
FIG. 12 is an exemplary computing apparatus.

Referring now to FIG. 12, a high-level illustration of an exemplary computing device 1200 that can be used in accordance with the systems and methodologies disclosed herein is illustrated. For instance, the computing device 1200 may be used in a system that is configured to generate video frames. By way of another example, the computing device 1200 can be used in a system that generates mixed reality video responsive to receiving video frames, where the mixed reality video includes animation that is based upon estimated positions of skeletal features of a human captured in the video frames. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store video frames, selectable animations, etc.

The computing device 1200 additionally includes a data store 1208 that is accessible by the processor 1202 by way of the system bus 1206. The data store 1208 may include executable instructions, selectable animations, video frames, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory storing instructions that, when executed by the processor, cause the processor to perform acts comprising:
   estimating positions of skeletal features of a human body captured in frames of video generated by a camera, wherein the positions of the skeletal features of the human body in the captured frames are estimated based solely upon the captured frames of the video generated by the camera, and further wherein estimating the positions of the skeletal features comprises:
   for a frame in the captured frames, generating an estimate of a position of a first skeletal feature of the human body;
   determining that the estimate of the position of the first skeletal feature is incorrect based upon the estimate of the position of the first skeletal feature relative to an estimate of a position of a second skeletal feature in the frame; and
   updating the estimate of the position of the first skeletal feature in the frame responsive to determining that the estimate of the position of the first skeletal feature is incorrect;
   generating mixed reality video frames based upon the estimated positions of the skeletal features of the human body, wherein the mixed reality video frames include the captured frames combined with an animation; and
   storing the mixed reality video frames in a computer-readable storage device.

2. The computing system of claim 1 being a mobile telephone, the mobile telephone further comprises the camera that generates the captured frames.

3. The computing system of claim 1, the acts further comprising:
   estimating expressions of a face of the human in the captured frames, wherein the expressions of the face of the human are estimated based solely upon the captured frames; and
   generating the mixed reality video frames based upon the estimated expressions of the face of the human in the captured frames, wherein the animation comprises a character with facial expressions that correspond to the estimated expressions of the face of the human.

4. The computing system of claim 1, the acts further comprising:
   receiving a captured video file, wherein the captured video file includes the captured frames; and
   including the mixed reality video frames in a mixed reality video file.

5. The computing system of claim 1, the acts further comprising:
   prior to generating the mixed reality video frames, receiving a selection of the animation from amongst several possible animations in a library, wherein the mixed reality video frames are generated to include the selected animation.

6. The computing system of claim 5, wherein the selected animation corresponds only to a portion of the human body, and wherein the selected animation, when included in the mixed reality video frames, covers only the portion of the human body.

7. The computing system of claim 5, wherein the selected animation corresponds to an entirety of the human body, and wherein the selected animation, when included in the mixed reality video frames, covers the entirety of the human body.

8. The computing system of claim 5, wherein the selected animation contacts the human body while leaving the human body visible in the mixed reality video frames.

9. The computing system of claim 1 wherein updating the estimate of the position of the first skeletal feature comprises interpolating between estimated positions of the first skeletal feature in frames that are adjacent to the frame in the video generated by the camera.

10. The computing system of claim 1, wherein estimating the positions of the skeletal features further comprises:
   in a second frame in the captured frames, generating a first estimate of a position of a third skeletal feature of the human body;
   determining that the first estimate of the position of the third skeletal feature is incorrect based upon a second estimate of the position of the third skeletal feature in a third frame that is adjacent the second frame in the captured frames; and
   updating the first estimate of the position of the third skeletal feature responsive to determining that the first estimate of the position of the third skeletal feature is incorrect.

11. The computing system of claim 10, wherein determining that the first estimate of the position of the third skeletal feature is incorrect comprises:
   identifying a distance between the first estimate of the position of the third skeletal feature in the second frame and the second estimate of the position of the third skeletal feature in the third frame;
   comparing the distance with a threshold; and
   determining that the distance is greater than the threshold.

12. A method executed on a computing device, the method comprising:
   estimating positions of skeletal features of a human body in frames of captured video generated by a camera, wherein the positions of the skeletal features are estimated based solely upon the frames of the captured video generated by the camera, wherein estimating the positions of the skeletal features comprises:
      for a first frame in the frames of the captured video, generating a first estimate of a position of a skeletal feature of the human body;
      for a second frame in the frames of the captured video that is adjacent to the first frame, generating a second estimate of the position of the skeletal feature of the human body; and
      determining that the first estimate of the position of the skeletal feature of the human body is incorrect based upon the second estimate of the position of the skeletal feature of the human body;
      updating the first estimate of the position of the skeletal feature responsive to determining that the first estimate of the position of the skeletal feature is incorrect; and
   generating a mixed reality video based upon the frames of the captured video and the estimated positions of the skeletal features of the human body, wherein the mixed reality video includes an animation combined with the frames of the captured video, wherein the animation corresponds to movement of the human body as represented by the estimated positions of the skeletal features of the human body in the frames of the captured video.

13. The method of claim 12, wherein the computing device is a mobile telephone, the method further comprising:
   receiving the captured video from the camera of the mobile telephone; and
   receiving a selection of the animation from a user of the mobile telephone, wherein the positions of the skeletal features are estimated responsive to receiving the selection of the animation.

14. The method of claim 12, further comprising:
   receiving the captured video from a client computing device by way of a network connection; and
   responsive to generating the mixed reality video, transmitting the mixed reality video to the client computing device.

15. The method of claim 12, further comprising:
   receiving a selection of the animation from a library of selectable animations; and
   generating the mixed reality video responsive to the animation being selected from the library of selectable animations.

16. The method of claim 15, wherein the animation solely covers an extremity of the human body in the mixed reality video.

17. The method of claim 15, wherein the animation covers an entirety of the human body in the mixed reality video.

18. A computer-readable storage medium comprising instructions that, when executed by a processor, cause the processor to perform acts comprising:
   receiving a captured video file generated by a camera, wherein the captured video file comprises frames, and further wherein the frames include a human body;
   estimating positions of skeletal features in the frames based solely upon the frames of the captured video file generated by the camera, wherein estimating the positions of the skeletal features in the frames comprises:
      generating an estimate of a position of a first skeletal feature of the human body in a frame of the frames of the captured video;
      generating an estimate of a position of a second skeletal feature of the human body in the frame of the frames of the captured video; and
      updating the estimate of the position of the first skeletal feature of the human body based upon the estimate of the position of the second skeletal feature of the human body;
   receiving a selection of an animation; and
   based upon the selection of the animation, the frames, and the estimated positions of the skeletal features in the frames, generating a mixed reality video file, wherein the mixed reality video file includes the frames combined with the animation, wherein the animation reflects movement of the human body as represented by the estimated positions of the skeletal features in the frames.

19. The computer-readable storage medium of claim 18 being included in a mobile telephone that includes the camera that is used to generate the captured video file.

20. The computer-readable storage medium of claim 18, wherein estimating the positions of the skeletal features in the frames further comprises:

determining a distance between the estimate of the position of the first skeletal feature and the estimate of the position of the second skeletal feature, wherein the estimate of the position of the first skeletal feature is updated based upon the distance.

* * * * *